United States Patent Office 3,346,390
Patented Oct. 10, 1967

3,346,390
PROCESS FOR PREPARING NUT BUTTER
FROM SOYBEANS
Michael J. Pichel, Chicago, Ill., and Theodore J. Weiss, Columbus, Ohio, assignors to Swift & Company, Chicago, Ill., a corporation of Illinois
No Drawing. Filed Dec. 6, 1963, Ser. No. 328,473
7 Claims. (Cl. 99—98)

This invention relates to improvements in the manufacture of soybean products and more particularly to improvements in the production of spreads and edible nut butters derived from soybeans.

The popularity and acceptability of food products derived from soybeans is becoming increasingly apparent, probably because of greater awareness on the part of the consumer of the nutritional value of the various food products utilized in the consumer diet. Thus, soybeans and foods derived from soybeans have acquired an increased importance because soybeans represent an excellent source of protein and the supply of soybeans is plentiful. In addition, soybeans contain a substantial amount of fat and only a small amount of fiber and other ingredients not readily utilizable by the human.

One drawback in the utilization of soybeans in foods has been the "grassy" or "beany" flavor so characteristic of products prepared from soybeans. Another apparent obstable in the promotion and acceptance of soybean-based foods previously has been in the fact that the presence of soybeans or soybean products has not been emphasized, but the soybean product was utilized only as a substitute ingredient in the food product.

Moreover, in the processing of soybeans, to adapt the soybeans for use in foods, the manufacturing and processing operations required to produce a given food item should be as simple and inexpensive as possible to avoid dissipating the low-cost advantages inherent in soybean products.

It is, accordingly, an object of this invention to provide an improved method for handling soybeans to produce an improved soybean food product.

Another object of the invention is the provision of a novel soybean-based food or food ingredient.

Still another object of the invention is to provide an improved method for manufacturing soybean-containing spreads and nut butter spreads.

Additional objects of the invention, if not specifically set forth herein, will be readily apparent to those skilled in the art from the detailed description of the invention which follows.

Generally, the invention comprises a unique series of manufacturing steps utilizing soybeans to produce a soy spread or a nut butter spread containing a substantial proportion of processed soybeans. It is possible by means of the present invention to produce a soy spread or a nut butter spread containing soybeans having a fine, nut-like flavor, a smooth texture, good color, freedom from graininess, and excellent nutritional characteristics. The process can be practiced very economically, largely with standard equipment, to produce large volumes of the product with comparatively small investment. The method includes the step of conditioning soybeans by moisturizing the beans with an amount of water which will, in combination with subsequent heating, affect removal of "beany" or "grassy" flavor without rendering the product tasteless. The moisturizing step should be controlled so as to avoid weakening of the structure of the bean. Such control is assured by adding only enough moisture to remove "beany" or "grassy" flavor constituents, but not so much moisture that the beans are saturated with water. Also involved are heating or frying steps and grinding of the beans to a very small particle size to form a smooth-textured spread.

More particularly, the process of the invention comprises the steps of moisturizing dehulled soybeans with water to increase the moisture content of the beans by about 5–15%, and not in excess of about 50%, added water, followed by quickly heating the moisturized beans to volatilize water and flavoring materials. The debittered beans are then promptly cooled and oil is added to the beans as required to provide beans having about 35–60% fat, based on the weight of the beans. The debittered bean-fat mixture is then subjected to grinding to reduce the particle size of the beans and form a smooth, uniform paste composed substantially of finely divided soybean solids, homogeneously dispersed in edible oil. The soybean butter can be utilized as such as a spread for bread or as an ingredient in candy or cake, as well as with other confections. In addition, the soybean spread or butter can be blended in all proportions with nut butter such as peanut butter, to form a uniform mixture which exhibits the most desirable features of both the peanut butter and soybean butter. This is an important advantage inasmuch as it has not been possible, using previously known soybean-derived materials with nut butters, because of the failure to produce a very finely ground soybean spread previously. In addition, soybean spread-type products have not been adaptable to uniform and homogeneous dispersion in peanut butter.

In carrying out the moisturizing step of the invention, the dehulled beans naturally containing about 13–26% fat and, generally, around 18–22% fat are sliced or split to increase the amount of available surface and the split beans are dipped in water, steamed or sprayed with water to add water to the beans. The moisture content of the beans is thereby increased by about 8–15%, and not in excess of about 50%, based on the weight of the beans. The moisture content of untreated soybeans can vary over a range of about 6.5–18% moisture, depending upon such factors as moisture content of the beans at the time of harvesting and the amount of drying to which the beans have been subjected. Accordingly, after the moisturizing step, the beans may contain about 11–68% water, but in most cases will contain about 14–33% water. The added moisture appears to penetrate and permeate the bean to an extent that the "grassy" or "beany" flavor constituents of the bean are volatilized, along with water, in the subsequent heating step. The amount of moisture added is not sufficient to saturate the bean and, the moisturizing step has little effect on the structure of the bean since little or no expansion or puffing takes place when the moisturized product is subsequently heated.

Debittering of the moisturized beans is carried out by submerging the beans or frying the moisturized soybeans in edible oil. This frying or cooking operation is carried out at a temperature and for a time sufficient to remove a substantial proportion of the moisture from the bean as evidenced by the evolution of steam. Frying of the beans in a deep-fat frying operation is carried out by immersing the moisturized product in vegetable oil or animal fat, heated to about 140–180° C. for about 1–10 minutes and preferably about 2–5 minutes. The time of heating is correlated with the temperature of the oil in the heating bath, i.e., heating is carried out for a longer period of time if the bath temperature is low, whereas only a short heating time is needed with very hot oil. Heating should be carried out until volatilization as evidenced by bubbling in the oil has terminated. The time of cessation of bubbling will depend upon the amount of water added to the beans in the moisturizing step, the temperature of the oil and the degree of agitation of the oil. The oil present in the cooking bath can be any edible oil which will not impart any objectionable off-flavor to the soybeans. Also, for optimum working conditions the oil selected should be one which does not smoke excessively. The hydrogenated vegetable oils such as hydrogenated soybean oil, hydrogenated cottonseed oil and mixtures thereof, as well as hydrogenated meat fats such as hydrogenated tallow and mixtures of hydrogenated tallow with hydrogenated vegetable oils, are very satisfactory for this purpose. Other cooking oils which have been used include lard, hydrogenated lard, corn oil and peanut oil. It is also possible to volatilize the "beany" flavor by roasting. In this embodiment of the invention, the moisturized product is heated at about 145–165° C. for about 5–30 minutes. During the cooking or frying step, the moisture in the beans is volatilized and the beans are very slightly browned. It is important that the cooking not be carried out for an excessive period of time, however, since overcooking results in removal of the desirable nut flavor which it is desired to retain. Overcooking results in the production of a burnt product having none of the distinctive soybean nut flavor.

In the process of the invention, the debittered soybean product, after removal from the cooker, is promptly passed into an oil-cooling bath. This cooling bath contains an edible glyceride oil such as soybean oil, safflower seed oil or other oils which are liquid at room temperature and also at temperatures down to about 0° C. The temperature of the cooling bath is maintained in the range of about 0–50° C. and preferably at about 20°–30° C. The cooling bath acts as a quenching medium, terminating the cooking in the hot soybeans, and also provides a source of oil to be absorbed by the hot soybeans. In the cooling bath, the temperature of the beans is lowered to about 10–40° C. and a certain amount of the oil in the bath is taken up by and clings to the beans.

After removal of the beans from the cooling bath, the oil content of the beans is increased by adding enough bland, edible oil to the beans to increase the oil content thereof to about 35–60%, based on the weight of the soybeans. The adjustment of the oil content of the soybean-oil mixture prior to grinding is important since it is difficult to obtain the fine subdivision desred with beans containing less than about 35% oil. In the practice of the invention, the beans are ground in apparatus not ordinarily used for grinding nutmeats and in the grinding step the beans undergo substantial burning and charring, if not fortified with added oil. Thus, edible glyceride oils and mixtures thereof such as cottonseed oil, soybean oil, safflower oil, corn oil, peanut oil, tallow, etc., which do not impart any flavor to the product are added to the beans prior to the grinding step.

The soybean product which is in the form of thin slices or split beans having oil mixed therewith so that the total oil content on a weight basis is about 35–60% is then passed through an Urschel Model MG cutting mill or equivalent comminuting apparatus, to form a smooth, homogeneous soybean product of butterlike consistency. The particle size of the soybean meats is substantially reduced in such a mill and the product should be ground so at least about 97.5% of the dried soybean solids contained in the spread passes through a 200-mesh screen. In a preferred form of the invention, at least about 99% of the oil-free solids passes through a 200-mesh screen. Particle size of the solids is readily determined by simply extracting the spread with diethyl ether or other oil solvent to free the particles of soybean solids from fat. It has been found that the tough soybean product of the invention possesses a strong structure and must be comminuted in a rather heavy-duty grinder such as the Urschel mill. The product emanating from the mill comprises a smooth, uniform soybean-oil mixture having a consistency very similar to peanut butter. The product is free of graininess and, also, possesses no noticeable "grassy" or "beany" taste.

The pretreated, debittered, cooked soybeans in admixture with the glyceride oil are subdivided to a very small particle size on a model MG Urschel mill. This mill is similar to the mill and impeller structure disclosed in United States Patent No. 2,937,558 and the MG model represents an improvement on the device disclosed in this patent. The mixture to be subdivided is introduced into an impeller rotating at a high speed within a cutting or shaving head. The centrifugal force exerted by the high speed impeller causes the product to move outwardly and strike closely-spaced vertical blades with great velocity, resulting in the removal of small particles or shavings from the larger mass of the soybeans. The particles are discharged from the head through the spaces between vertical blades. The soybean pieces by this action are pressed centrifugally against the wall of the chamber, and the chamber has small slotted discharge passages leading outwardly through the wall. The soybean pieces are sheared and the cut pieces are discharged through the passages by pressure exerted by succeeding cut-off fragments. The impeller operates at speeds between 900 and 9500 r.p.m. and for most efficient subdivision of the soybeans, is operated at about 7500 r.p.m. It has been found that in this manner it is possible to attain the high degree of subdivision of the soybean product and avoid graininess.

It is possible to enhance the soybean spread, both with respect to palatability and acceptability, by incorporating sugar, salt, and other flavoring agents, including artificial flavors as desired. The addition of about 1–4% hardened cottonseed oil or other hard fat or hardened monoglycerides also enhances the product by rendering the product less sticky and, also, preventing separation in the product.

The following specific embodiments of the invention are presented herein in order to illustrate the invention and these examples should not be considered as imposing any limitation on the invention.

*Example I*

20 pounds of whole soybeans were split and dehulled and water was sprayed as a fine mist over the beans until the beans contained 8% additional moisture. The moisturized beans were then held at room temperature (20° C.) for about 15 minutes to permit the moisture to penetrate into the beans. The moisturized product was then placed in a container of hydrogenated soybean oil heated to 180° C. Frying of the beans in the hot oil was completed in 3 minutes, and the fried product was immediately immersed in a quenching bath of soybean oil held at 15° C. After 5 minutes in the cooling bath, the fried product was mixed with additional soybean oil to form a mixture which contained 50% oil. This mixture was passed through the Urschel Model MG grinder equipped with a shaving head and the beans were passed through the comminuting chamber of the grinder where the pieces are cut and extruded to a very fine particle size so that 98% of the solids remaining after extraction of the product with diethylether passes through a 200-mesh screen. The ground product is smooth, homogeneous, and has a consistency approximating that of peanut butter. Although it has a pleasing nut-like taste, there is no noticeable "beany" or "grassy" flavor.

*Example II*

10 pounds of whole soybeans are split and dehulled and sprayed with water until the weight is increased to 15 pounds. The moisturized beans are held at room temperature for about 30 minutes and then placed in a container at hot peanut oil heated to a temperature of 170 ° C. Frying of the moisturized beans and volatilization of flavor components is carried out by heating in the bath for 5 minutes. The fried beans are then immersed in a bath of peanut oil held at 25° C. After about 10 minutes in this cooling bath, the beans are mixed with peanut oil so as to increase the oil content of the mixture to 35% oil by weight. After grinding of the fried bean-oil mixture in the Urschel Model MG grinder to a very small particle size, a smooth textured product, free from graininess and "beany" or "grassy" flavor is produced. When a sample of the product is extracted with diethylether to remove the fat therefrom, 97.5% of the remaining oil-free solids passes a 200-mesh screen.

A similar preparation to which 3% hardened (50–52° C. titer) cottonseed oil was added shows an improved resistance to separation of solids from the oil in the product and the product is less tacky than that not containing added hard fat. Similarly, other hardened glyceride oils having a titer above 50° C. can be substituted for the hydrogenated cottonseed oil. Hydrogenated lard, hydrogenated tallow, hydrogenated soybean oil, or hard monoglycerides having a titer in the range of around 50–60° C., can be substituted for the hydrogenated cottonseed oil to enhance the physical characteristics of the product.

Obviously, many modifications and variations of the invention as hereinbefore set forth may be made without departing from the spirit and scope thereof and, accordingly, only those limitations should be imposed as are indicated in the appended claims.

We claim:

1. A process for preparing nut butter comprising: moistening split, dehulled soybeans in an amount of water sufficient to add about 5–50% water based on the weight of the soybeans to said soybeans to precondition soya flavors for volatilization, heating the moistened soybeans at a temperature and for a time sufficient to volatilize water and volatile flavor substances of said soybeans, adding edible oil to the deflavored soybeans to provide an oil content in said beans of about 35–60% and form a soybean-oil mixture, and grinding the oil-soybean mixture to a particle size such that at least 97.5% of the oil-free solids contained in the ground product passes a 200-mesh screen.

2. A process for preparing a soy spread of improved flavor, color, and consistency from soybeans comprising: moisturizing dehulled soybeans with an amount of water sufficient to increase the moisture content of said soybeans by about 5–50% based on the weight of said soybeans, promptly contacting said soybeans with hot, edible oil at a temperature sufficient to volatilize the water present in said soybeans, adjusting the fat content of said soybeans to about 35–60% by adding an edible oil, and subdividing said soybeans whereby to reduce the particle size thereof so that at least about 97.5% of the fat-free solids passes a 200-mesh screen.

3. An improved method for preparing a nut butter of smooth, uniform texture and pleasing nutlike flavor comprising: contacting dehulled, split soybeans with water to increase the moisture content of said soybeans by about 5–50% based on the weight of said soybeans, cooking said soybeans in an edible cooking oil at a temperature of about 140–180° C. for a time sufficient to volatilize water and grassy and beany flavor components yet avoid puffing or expansion of the product, adding edible oil to said soybeans to provide an oil content in said beans of about 35–60% and grinding the cooked soybeans to a very small particle size, so that at least about 97.5% of the oil-free solids in said soybeans passes a 200-mesh screen.

4. An improved method for preparing a soybean spread of smooth, uniform texture and pleasing nutlike flavor comprising: contacting dehulled, split soybeans with steam to increase the moisture content of said soybeans by about 5–50% based on the weight of said soybeans, heating said steamed soybeans at a temperature of about 140–180° C. for a time sufficient to volatilize water contained in said soybeans yet avoid puffing and expansion of said soybeans to produce a debittered soybean product, adding edible oil to said soybean product to provide an oil content in said beans of about 35–60%, comminuting the debittered soybean product to a very small particle size such that at least about 97.5% of the oil-free solids present in said comminuted product passes a 200-mesh screen.

5. A process for preparing a soya spread of improved flavor, color, and consistency from soybeans comprising: moisturizing dehulled soybeans in an amount of water sufficient to increase the moisture content of said soybeans by about 5–50% based on the weight of said soybeans, promptly heating the moisturized soybeans to a temperature of about 140–180° C., maintaining said heating until the moisture contained in said soybeans is volatilized and a debittered soybean product is produced, adding edible oil to said soybean product to provide an oil content in said beans of about 35–60%, comminuting the debittered soybean product to a particle size of the fat-free soybean solids such that at least 97.5% of said solids passes a 200-mesh screen, and adding to the comminuted product about 1–4% of a hard fat.

6. A process for preparing soybean spread comprising moistening split dehulled soybeans with an amount of water sufficient to increase the moisture content of said soybeans by about 8–15% based on the weight of said soybeans to precondition soya flavors for volatilization, heating the moistened soybeans at a temperature and for a time sufficient to volatilize water and volatile flavor substances present in said soybeans, adding edible triglyceride oil to the deflavored soybeans to provide an oil content in said beans of about 35–60% and form a soybean-oil mixture and subdividing the oil-soybean mixture to a particle size such that at least 97.5% of the oil-free solids contained in the ground product passes a 200-mesh screen.

7. An improved method for preparing a soybean spread having a uniform texture and pleasing nut-like flavor comprising contacting dehulled split soybeans with water to increase the moisture content of said soybeans by about 5–50% based on the weight of said soybeans, cooking said soybeans in an edible cooking oil at a temperature of about 140–180° C. for a time sufficient to volatilize water and grassy and beany flavor components, yet avoid puffing and expansion of the product, promptly cooling said product to a temperature of less than about 50° C. and comminuting the cooked cooled soybeans in admixing with added glycerized oil in an amount sufficient to increase the total oil content of the mixture to about 35–60% edible oil, said comminution being sufficient to reduce particle size of said soybeans so that at least about 97.5% of the oil-free solids present in said comminuted product passes a 200-mesh screen.

References Cited

UNITED STATES PATENTS

| 1,189,128 | 6/1916 | Kellogg | 99—98 |
| 1,395,934 | 11/1921 | Stockton | 99—128 |
| 1,615,822 | 2/1927 | Baile | 99—98 |
| 3,127,272 | 3/1964 | Baker et al. | 99—128 |

A. LOUIS MONACELL, *Primary Examiner.*

RAYMOND N. JONES, *Examiner.*

S. E. HEYMAN, *Assistant Examiner.*